INVENTORS
W. PAUL DIXON
DAVID N. KENDALL
BY Charles B. Haverstock
ATTORNEY

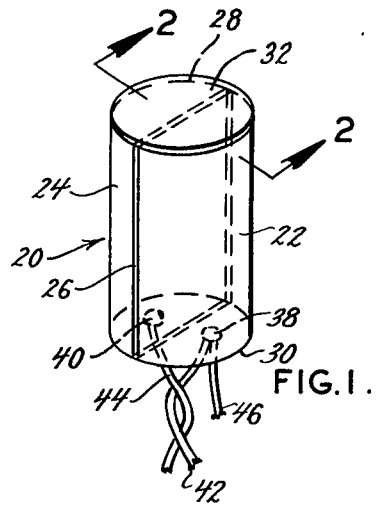
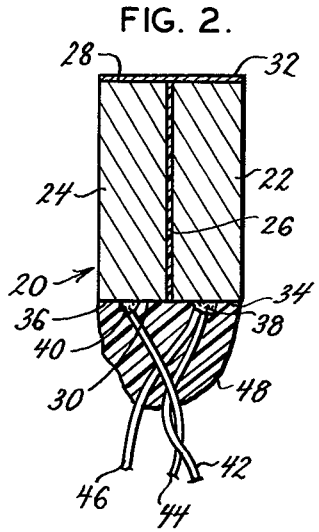
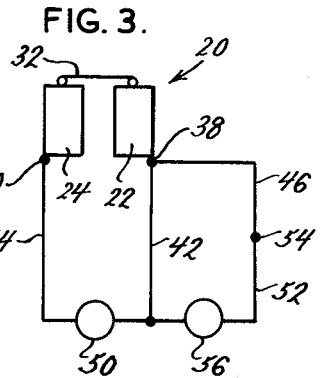
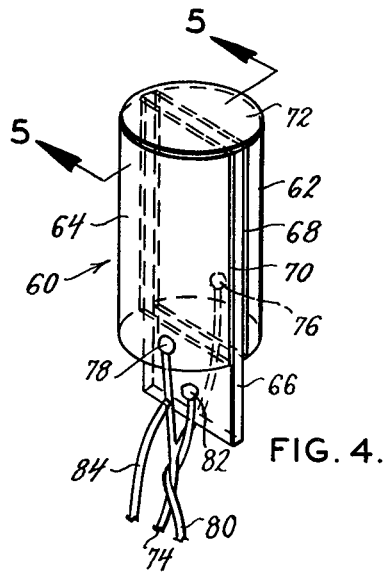
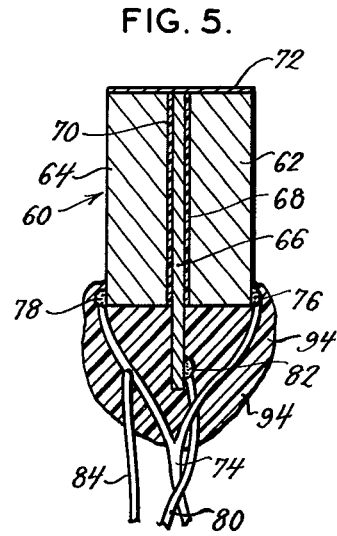
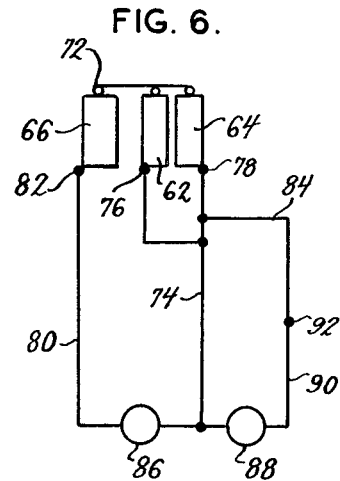
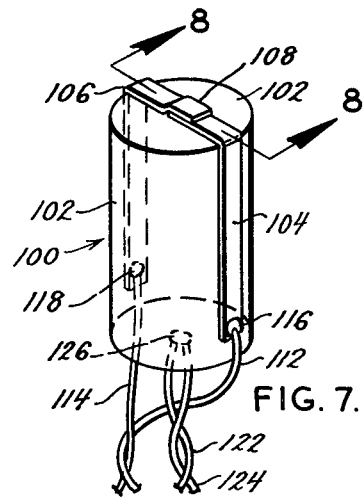
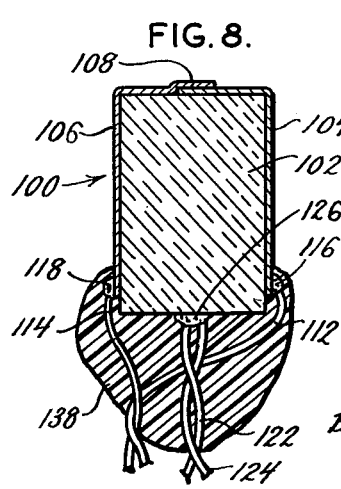
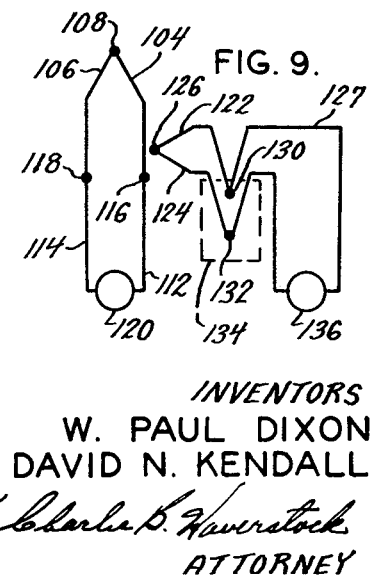

//! # United States Patent Office

3,671,328
Patented June 20, 1972

3,671,328
SEMICONDUCTOR TEMPERATURE SENSITIVE MEANS
William Paul Dixon, Florissant, Mo., and David N. Kendall, Alton, Ill., assignors to McDonnell Douglas Corporation, St. Louis, Mo.
Filed Aug. 28, 1967, Ser. No. 663,757
Int. Cl. H01v 1/04
U.S. Cl. 136—230
11 Claims

ABSTRACT OF THE DISCLOSURE

A temperature measuring thermocouple device constructed of at least two semiconductor materials having differing thermoelectric properties, said materials having adjacent surfaces arranged and constructed to form a thermoelectric junction therebetween for exposing to a temperature condition to be sensed and measured, said device also having electrical connection means attached to each of the semiconductor materials at plates thereon remote from the junction for connection to suitable meter means.

---

Many temperature measuring devices including various forms of thermocouples are known in the art and are available and in use. The known devices for the most part are relatively complicated structurally and require expensive electrical readout instruments and other means, and the known devices are relatively inaccurate or insensitive for many purposes and are incapable of measuring relatively small, short duration transient temperature changes as small as a fraction of a degree or so and occurring over time intervals as short as a few microseconds or less. The present invention overcomes these and other limitations and shortcomings of the known temperature senstive devices by teaching the construction and operation of relatively simple and inexpensive temperature sensitive means employing semiconductor components, which means are extremely sensitive and fast acting and are able to sense temperature changes of the order of a small fraction of a degree occuring in time intervals as short as a microsecond or even less. The present temperature sensitive means can also be used with known readily available electrical read-out and recording devices.

It is therefore a main object of the present invention to provide temperature sensitive means employing semiconductor materials.

Another object is to provide more accurate and more sensitive means for measuring temperature.

Another object is to provide means capable of sensing minute transient temperature conditions.

Another object is to provide temperature sensitive means having extremely fast repsonse characteristics.

Another object is to provide relatively small, lightweight and compact temperature measuring means.

Another object is to provide temperature sensitive means which can be made in many different sizes and shapes.

Another object is to provide temperature sensitive means capable of responding to temperature fluctuations lasting a microsecond or less and which can also be constructed to measure temperature fluctuations occuring over much longer periods of time.

Another object is to provide a temperature sensitive thermocouple capable of generating relatively large outputs for the size of temperatures and temperature gradients being measured.

Another object is to provide means for accurately measuring surface temperatures and surface temperature changes.

Another object is to provide a thermocouple device constructed employing semiconductor materials and having relatively low impedance characteristics.

Another object is to provide temperature sensitive means suitable for use in temperature control devices and the like.

Another object is to provide improved means for measuring surface temperatures on thermodynamic models and like structures without altering the thermodynamic characteristics of the structures.

Another object is to provide improved and more accurate means for measuring temperatures and temperature variations in living objects such as in a human body.

These and other objects and advantages of the present device will become apparent after considering the following detailed specification which covers several embodiments of the device in conjunction with the accompanying drawings, wherein:

FIG. 1 is an enlarged perspective view showing a temperature sensitive device construction according to the present invention;

FIG. 2 is a cross-sectional view taken on line 2—2 of FIG. 1;

FIG. 3 is a schematic wiring diagram showing an electric circuit for connection to the device of FIGS. 1 and 2;

FIG. 4 is an enlarged perspective view showing a modified form of the present invention;

FIG. 5 is a cross-sectional view taken on line 5—5 of FIG. 4;

FIG. 6 is a schematic wiring diagram showing an electric circuit for connection to the modified device of FIGS. 4 and 5;

FIG. 7 is an enlarged perspective view showing another modified form of the present device;

FIG. 8 is a cross-sectional view taken on line 8—8 of FIG. 7;

FIG. 9 is a schematic wiring diagram showing an electric circuit for connection to the modified device of FIGS. 7 and 8;

Figure 10:
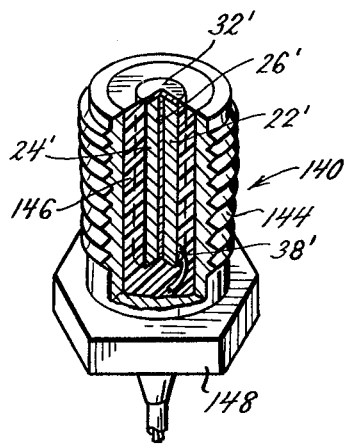
FIG. 10 is an enlarged perspective view cut-away to expose the interior of a temperature sensitive device constructed along the lines of the device shown in FIG. 1.

Referring to the drawings more particularly by reference numbers, number 20 generally refers to a solid state temperature sensitive element constructed of two spaced semiconductor components 22 and 24 joined together by a layer 26 of insulating material. The insulating layer 26 may be an adhesive material and preferably should be made relatively thin. As shown in FIG. 1, the element 20 is cylindrical in shape and is defined by spaced end surfaces 28 and 30, the upper of which is ground and polished in a careful manner so as to maintain the elements 22 and 24 electrically insulated from each other. In the drawing, the end surfaces 28 and 30 are also shown formed at right angles to the axis of the element 20 and at right angles to the insulating layer 26.

A relatively thin layer 32 of an electrically conducting material such as copper, gold, silver or other suitable material is applied on or attached to the ground and polished end surface 28 in a manner to establish electrical continuity between the corresponding end surfaces of the semiconductor components 22 and 24. Various means can be used for applying the conducting layer 32 including attaching a thin film of the conducting material, electrodepositing the said conducting layer, spraying or vaporizing the constituents of the conductor layer or even exposing the polished end surface to a beam of ions. The important thing is that the electrically conducting layer make good electrical connection with the end surfaces of the semiconductor components 22 and 24 where it is attached. This is important to the operation of the present device for reasons which will be shown hereinafter.

The end surfaces 34 and 36 at or adjacent to the opposite ends of the semiconductor components 22 and 24 from the conducting layer 32 are provided with connections 38 and 40, respectively, which are used to connect leads 42 and 44, respectively, to the layers 22 and 24 as shown in FIGS. 1 and 2. A second lead 46 may also be connected to the connection 38 for reasons which will be explained later. The leads 42, 44 and 46 are provided for connecting the subject temperature sensitive element 20 into an electrical circuit including meter means for measuring temperatures such as the circuit shown in FIG. 3. The connections 38 and 40 and the adjacent portions of the leads 42, 44 and 46 connected thereto are also shown encapsulated in a body 48 of some electrically and thermally inert substance such as polyvinyl chloride.

The distance along the semiconductor components 22 and 24 from the connections 38 and 40 at one end of the device to the overlayer of electrically conducting material 32 at the opposite end is important to the present invention because this distance in part determines the length of time that the subject device can be used to measure temperature before its accuracy is affected. In this connection, it should be noted, that the conducting layer 32 is the part of the subject instrument which is usually exposed to the temperature being measured. If the temperature at the layer 32 is substantially different (higher) than than the temperature at the opposite end of the device at the connections 38 and 40, a temperature gradient will be established in the device between the opposite ends thereof, and the thermal conductivity characteristics of the semiconductor layers 22 and 24 as well as their lengths will determine the length of time it will take for the temperature at the layer 32 to affect the temperature at the connections 38 and 40. This in turn will effect the length of time the subject device can be used accurately to measure a given temperature condition. After a period of time the temperature at the conducting surface 32 will penetrate the element 20 and will change the temperature at the connections 38 and 40. When this happens the device will no longer give accurate readings. This condition is further aggravated by the fact that a temperature change produced at the connections 38 and 40 will also be reflected back through the device to the end of the device having the conducting layer 32. As already stated, the distance between the opposite ends of the element also affects the time duration that the device can be used for measuring a particular temperature. For example, a relatively long element end-to-end will be able to measure a temperature condition over a longer period of time than the shorter elements assuming both devices are constructed of the same materials.

The sensitivity and outputs produced by the subject device also depend upon the particular semiconductor materials employed, the size and shape of the elements including the size and shape of the semiconductor components 22 and 24 and the thickness of the conducting layer 32. For the greatest accuracy and sensitivity the conducting layer 32 should be constructed of high thermal conductivity material so the temperatures at both sides of layer 32 will be as close to identical as possible, and the layer 32 should also be constructed to be as thin as possible to have a relatively low thermal capacity so that a minimal amount of heat energy is required to change its temperature. Layer thicknesses in a range from approximately .00008 to .00004 inch or less are contemplated for best results. Greater thicknesses can also be used but there may be some loss of accuracy and sensitivity as a result.

The present construction has distinct, important advantages over more conventional thermocouples such as those that are constructed of dissimilar metals joined so as to form an electrical circuit. In the more conventional constructions it is found that outputs that are generated when the junctions between the different metal parts are at different temperatures are relatively small in relation to the temperature being measured. The present device, on the other hand, is able to produce much larger outputs for corresponding temperatures and temperature changes than the known thermocouple devices because it employs semiconductors which have better temperature response characteristics and hence are more sensitive and produce much better accuracy.

FIG. 3 shows a simplified electrical circuit in which the device of FIGS. 1 and 2 is connected. In the circuit it can be seen that the leads 42 and 44 which are connected respectively to the connections 38 and 40 have their opposite ends connected to opposite sides of an electrically responsive measuring instrument capable of producing an indication as to the output that is produced between the connections 38 and 40 as a result of a temperature gradient existing between two ends of the element 20. For most purposes, it is important that the connections 38 and 40 be at the same constant temperature condition throughout any given temperature measurement. When this condition exists and where the electrically conducting layer 32 is exposed to a temperature to be measured which is different from the temperature at the connections 38 and 40, a measurable temperature gradient will be established in the semiconductors 22 and 24. This is true because the layer 32 is in electrical and thermal contact with both the semiconductors at one end of the device. Also, because the layer 32 is relatively thin and has low thermal capacity the temperature being measured will be present on the semiconductors in a condition substantially unaffected by the conductor layer 32. This is obviously highly desirable and necessary to the accuracy and sensitivity of the device. Therefore, the temperature at the polished end surface 28 of the element 20 will be the same temperature as the temperature being measured. During the brief measurement period, however, the temperature at the connections 38 and 40 will remain unchanged but will usually be different from the temperature being measured so that a thermal gradient will be established. The semiconductor components 22 and 24 being constructed of different semiconductor materials having different thermoelectric characteristics, therefore produce different responses to the thermal gradient. The thermal gradient produced thereacross will therefore produce Seebeck voltages in the respective semiconductors and these voltages because of the difference in the semiconductors employed will exist in an additive manner between the connections 38 and 40, and hence also between the leads 42 and 44. The sum of these Seebeck voltages also is present across the meter 50. The meter 50 will therefore produce a reading or other indication of these combined outputs from which the temperature can then be determined. After a predetermined time period has elapsed depending upon the heat conductivity characteristics of the semiconductor components 22 and 24 and the distance between opposite ends thereof the heat energy at the electric conducting layer 32 will begin to effect the temperature at the connections 38 and 40. When this happens, the reading on the meter 50 may be affected. The temperature changes thus produced at the connections 38 and 40 will also reflect back to the opposite end of the element 20 as aforesaid. The time required for the heat produced at the conducting layer 32 to travel from one end of the element to the other is therefore a limiting factor which determines the time duration of any given measurement. The physical dimensions and characteristics of the materials used in the device also effect the operation as aforesaid.

The aforementioned Seebeck voltages generated in the semiconductors are dependent upon the Seebeck coefficient of the device and the thermal gradient between the junction and the places where the connection leads are attached. The Seebeck coefficient sometimes called the thermoelectric sensitivity (E) is defined as the ratio of the Seebeck voltage ($\Delta V$) which is the back voltage generated by the tendency of mobile charge carriers in a material to travel from hotter to colder places along a thermal gradient, to the thermal gradient or temperature difference ($\Delta T$) between said places, said ratio being expressed by the equation $$E = \Delta V / \Delta T$$

The lead 46, which is shown in FIGS. 1 and 2 connected to the connection 38 may also be connected to connection 40 and is constructed of a different material than the material used in the leads 42 and 44. As shown in FIG. 3 the opposite end of the lead 46 from connection 38 is connected to another lead 52 which is constructed of the same material as the leads 42 and 44 or in some cases it may be constructed of a material having still different thermoelectric characteristics. The point where the leads 46 and 52 are connected is indicated by the number 54 in FIG. 3. The connection 54 is preferably positioned in a controlled constant temperature environment such as in a container of ice water. This is done to create a thermal gradient between the connection 38 and 54. A second electrical instrument such as meter 56 is connected in the circuit between the lead 52 at the opposite end thereof from the connection 54 and some point on the lead 42. The meter 56 will therefore produce an ouput which is due to the thermal gradient that exists between the connections 38 and 54. The output of meter 56 is an output which is dependent in part on known and controllable temperature conditions and is a useful output in that it enables calculations of the temperature at the connections 38 and 40. Hence, it can be seen that the output of the meter 50 represents a value which is produced by the temperature gradient between the opposite ends of the element 20, namely, between the layer 32 and the surfaces 34 and 36, while the output of meter 56 represents a value which is produced by the temperature gradient between the surfaces 34 and 36 and a known temperature condition, namely the temperature at the connection 54. With this information, it is then possible to calculate the absolute temperature at a given instant at the conducing layer 32.

FIGS. 4-6 show another embodiment 60 of the subject element. The element 60 is somewhat more complicated than the device 20 and is constructed of two spaced components or layers 62 and 64 of the same type of semiconductor material, which layers are attached respectively to opposite sides of a third layer 66 of a different type of semiconductor material by suitable attaching means such as a non-conducting insulating bonding material arranged in layers 68 and 70 positioned as shown. In the construction 60 the middle or third semiconductor layer 66 extends outwardly from one end of the element opposite the end which includes a thin metal conductive overlayer 72 similar to the layer 32 in FIG. 1.

One of the obvious differences between the modified construction 60 and the construction 20 is that the modified construction has two similar semiconductor layers 62 and 64, each of which is in contact with the conductive layer 72 at one end, and each of which has a connection to a common output lead 74 adjacent to their opposite ends at connection points 76 and 78. Another output lead 80 is connected to the middle semiconductor layer 66 at connection point 82 thereon. In the modified construction the electrical conducting layer 72 establishes electrical continuity between all the adjacent end surfaces of the three semiconductor layers 62, 64 and 66 instead of between only two as in the construction shown in FIG. 1, and hence it is anticipated that the device 60 may actually be able to produce a greater output for its size than the device 20 because two semiconductor elements instead of one are contributing to producing the output on the lead 74. To some extent this construction may also have improved sensitivity characteristics due to this same feature.

Another lead 84, constructed of material dissimilar to the material of similar leads 74 and 80 is shown connected to the lead 74 at a suitable location therealong or at the connection thereof to one of the associated semiconductor layers at connection 76, 78 or 82. The lead 84 in the construction shown in FIGS. 4 and 5 corresponds to the lead 46 in the structure of FIGS. 1 and 2.

The circuit for the modified construction 60 is shown in FIG. 6 and is basically quite similar to the circuit shown in FIG. 3. Note, however, that in the modified circuit one of the meters 86 is connected between the leads 74 and 80 while the other meter 88 is connected between the leads 74 and another lead 90, while lead is connected at connection point 92 to the lead 84. The connection 92 is positioned in a controlled temperature environment such as an ice water bath or some other suitable location as described above for the connection 54 in FIG. 3. It is also anticipated that the leads and connections for the modified construction will be embedded in a suitable potting material 94 to prevent them from being subjected to damage due to shock and vibration and also to prevent them from being exposed to the elements. Except for the differences in structure as noted, the modified device 60 operates and is used for the same general purposes as the structure 20 described above. Note, however, that in the modified construction each side and the center portion of the device contributes a portion to the output which is not true of the aforemenioned structure, which has but two semiconductor components. The time duration for making accurate temperature measurements using the device of FIGS. 4 and 5 is generally dependent upon the same factors which control the device of FIGS. 1 and 2.

FIGS. 7 and 8 show another modified embodiment 100 in which a non-conducting substrate member 102 shown as being cylindrical is used to support two strips 104 and 106 of different semiconductor materials. The substrate 102 can be constructed of any low heat conducting and preferably non-electrically conducting material such as glass or ceramic, and the semiconductor strips 104 and 106 can be formed by depositing them on the outer surface of the substrate 102 so that at least a portion of one of the strips overlaps a portion of the other strip to form a junction 108 therebetween. It is also important that the semiconductor strips 104 and 106 can be constructed of dissimilar types of semiconductor materials. Output lead wires 112 and 114 constructed of similar material are connected respectively to the strips 104 and 106 at connection locations 116 and 118, respectively, which are located thereon remote from the junction 108. The opposite ends of the leads 112 and 114 are connected across a suitable electrical meter or other instrument 120 as shown in FIG. 2. Two other leads 122 and 124 dissimilar from each other are connected together at connection point 126, which point is shown located on the body of the substrate 102 at some neutral location such as shown in FIGS. 7 and 8 preferably so that the connections 116, 118 and 126 are all at the same constant temperature during a measurement. Referring to FIG. 9 it can be seen that the leads 122 and 124 are also connected respectively to other leads 127 and 128, constructed of similar material, at connection points 130 and 132 which form additional thermocouples which are shown positioned in a controlled temperature environment such as in ice water vat 134. The opposite ends of the leads 126 and 128 are also connected across a second meter 136 which is used for the same or similar purposes as the meters 56 and 88 described above. As in the previous constructions the leads and their associated connections to the subject device may be embedded in a potting material 138. The modified construction 100 differs from the constructions disclosed above mainly because the semiconductor components are in more direct contact with each other at the junction 108 where they overlap, and therefore there is no need to provide a separate conductive layer such as the layers 32 and 72. The device 100 therefore has a greatly increased sensitivity as a result of lower thermal conductivity of the element 102 than is the case of the construction shown in FIGS. 1 and 2 with respect to the elements 22 and 24. Also the device 100 provides an increased time period of useful data as a result of the increased time required for the temperature at 116 and 118 to be affected by surface temperature changes at 108. There may, however, be a small loss of accuracy particularly of very short duration signals due to increased thermal capacity of the elements 104 and 106 that form the junction 108 where the thickness exceeds about .00008 inch. Except for these differences, however, the modified construction 100 is similar and operates similarly to the constructions disclosed above. It is to be noted, however, in connection with the circuit of FIG. 9 that the Seebeck voltages generated in the device 100 are generated between opposite ends of the strips 104 and 106 in a manner similar to the above devices. It is also to be noted that the leads 122 and 124 are constructed to thermoelectrically dissimilar materials and are connected to leads 126 and 128 which may be of the same or similar material for the same reasons as in the above structures.

FIG. 10 shows a prototype of a n-p germanium surface thermocouple 140 constructed along the lines of the device shown in FIGS. 1 and 2. The parts of the device 140 which correspond to parts in the structure 20 are numbered the same but are primed. The device 140 also includes a hollow threaded steel jacket 144 in which is positioned potting compound 146. A p-type germanium component 22′, n-type germanium component 24′, and an epoxy insulator layer 26′ positioned between the semiconductors are shown. The upper end of the device as shown includes a thin gold film 32′. The other components of the device 140 are also shown in FIG. 10 including the various leads and connections; and the device is provided with a hexagonal metal base 148 for use in tightening it into position. The entire prototype can be constructed to be as short as .5 centimeter or shorter or it can be made in larger sizes. Note, that when the device 140 is in operative condition the layer 32′ is exposed to the condition to be measured.

Figure 11:
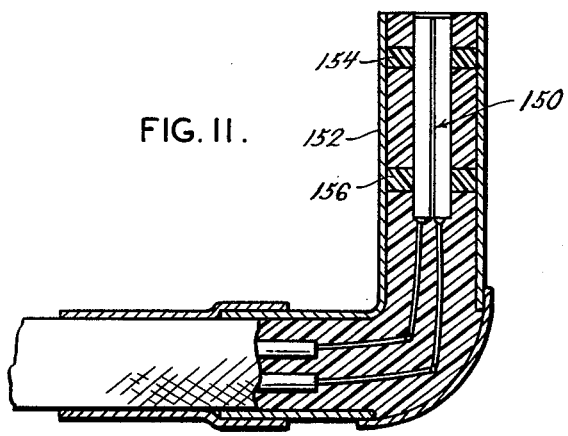
FIG. 11 is a side view partly in cross-section showing another embodiment of the present device.

FIG. 11 shows another application of the subject invention in which the device 150 is mounted in a tube 152 on spaced insulating supports 154 and 156. This construction is used for obtaining data to calculate heat transfer into a surface. Such calculations may be independent of absolute temperature conditions and therefore there is no need for a reference thermocouple such as is included in some of the other constructions. The parts of the device 150 are similar to the other constructions.

Figure 12:
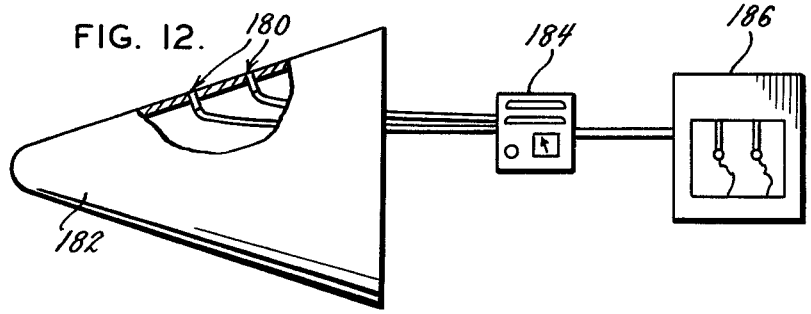
FIG. 12 is a side view partly cut-away showing an aerodynamic body having a temperature sensitive device constructed according to the present invention installed therein; and, FIG. 13 is a side view partly cut-away showing a rocket nozzle having a temperature sensitive device constructed according to the present invention installed therein.

FIG. 12 shows an application of the subject device in which the two similar devices 180 are mounted in the surface of an aerodynamic body 182 which is being tested in a wind tunnel or the like. The devices 180 may be similar to the device 150 in FIG. 11 and their outputs are shown connected to a D.C. amplifier 184 and to a strip recorder device 186 or the like.

Figure 13:
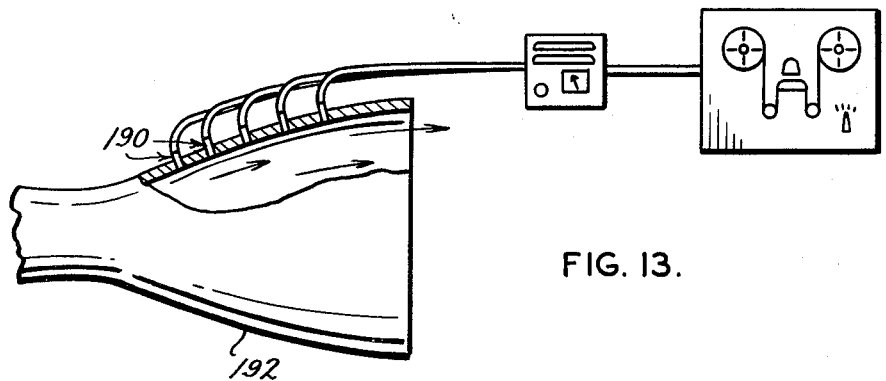

FIG. 13 shows another application in which thermocouples 190 which are also similar to the device 150 of FIG. 11 are positioned along a rocket nozzle 192 or similar device to measure the temperature fluctuations on the interior surface thereof.

The high degree of sensitivity and accuracy of the subject devices and the fact that they can be made in widely varying sizes and shapes makes them useful for many different purposes including scientific and medical uses where accurate temperature measurement is desired. For example, it is contemplated to use the present device to measure and monitor internal and external temperatures in a living body.

Thus there has been shown and described novel temperature sensitive means constructed using semiconductor components which fulfill all of the objects and advantages sought therefor. Many changes, alterations, modifications, and other uses and applications of the subject means will, however, become apparent to those skilled in the art after considering this specification and the accompanying drawings which disclose several different embodiments thereof. All such changes, alterations, modifications, and other uses and applications of the subject means which do not depart from the spirit and scope of the invention are deemed to be covered by the invention which is limited only by the claims which follow.

What is claimed is:

1. A temperature sensitive device for measuring transient short duration temperature conditions in an environment comprising a plurality of spaced semiconductor elements having different thermoelectric response characteristics, each of said elements having a finite length and corresponding spaced end surfaces, means forming at least one junction between the corresponding end surfaces at one end of the device, said junction forming means including an exposed layer of electrically conducting material having a thickness not greater than about .00008 inch positioned on said end surfaces at said one end, said exposed layer having a surface exposed to said environment a layer of insulating material having a thickness not greater than about .00008 inch positioned between the said elements and in contact therewith and extending to adjacent the exposed layer, other means including at least one electrical lead connected to each of said elements at a point thereon remote from the junction to form other junction connections therewith, means mounting said device with the exposed junction forming layer only exposed to a temperature condition to be sensed, said mounting means isolating the locations on said elements where the electrical leads are connected from said environment the temperature condition being sensed, said device generating a signal between said leads whenever the temperature at the junction is different from the temperature where said leads are connected to the associated elements.

2. The device defined in claim 1 wherein said layer of electrical insulating material includes a layer of insulating bonding material positioned between and in contact with the semiconductor elements bonding said elements together with the elements insulated from each other.

3. The device defined in claim 1 wherein the points where said leads are connected to said semiconductor elements are located in an isothermal region remote from the means forming the junction between the corresponding end surfaces.

4. The device defined in claim 3 wherein a separate thermocouple device is positioned in the isothermal region, said separate thermocouple including a pair of connected together lead elements having dissimilar thermoelectric properties.

5. The device defined in claim 3 wherein a second lead constructed of a material having different thermoelectric characteristics than the aforesaid leads is connected to one of the aforesaid leads to form a thermoelectric junction therewith at the place of connection, said last named junction being at a location within the isothermal region of the device.

6. The device defined in claim 1 wherein the lead connection points and adjacent portions of the leads connected thereto are encapsulated in potting material.

7. The device defined in claim 1 wherein the semiconductor elements have a long dimension in a plane substantially perpendicular to the conductor layer than parallel thereto.

8. The device defined in claim 1 wherein a pair of leads having different thermoelectric characteristics are connected together at a location on the body that is at the same temperature as the temperature where the aforesaid leads are connected to the semiconductor elements.

9. Temperature sensitive means for sensing transient short duration temperature conditions in an environment comprising an element constructed to include at least two portions of semiconductor material each having a different thermoelectric characteristic, electrical insulating means having a thickness no greater than about .00008 inch positioned between and bonding said portions together in juxtaposed position, each of said portions having a predetermined length and opposite end surfaces, an exposed layer of electrically conducting material having a thickness no greater than about .00008 inch attached to corresponding end surfaces of said semiconductor portions and extending across the insulating bonding means to establish electrical continuity between the said end surfaces, said exposed layer having a surface exposed to said environment means connected to each of said semiconductor portions at a location thereon that is spaced a predetermined distance therealong from said electrical conducting layer to form respective junction connections therewith, the distance between said connection locations and said layer of electrically conducting material and the thermal conductivity characteristics of the semi-conductor layers determining the operating conditions of the temperature sensitive means including controlling of the length of time the subject means can be used to accurately measure a particular transient temperature condition, and means for mounting said element so that the layer of electrically conducting material at the corresponding end surfaces of the semiconductor portions is exposed directly to a temperature condition to be sensed, and so that the means connected to each of said semiconductor portions at locations spaced from the electrical conducting layer are thermally isolated from the environment including the temperature condition being sensed and are located in a substantially isothermal temperature environment subject to different conditions than the temperature condition to be sensed.

10. The means defined in claim 9 wherein one of said semiconductor portions is constructed of n-type germanium and the other of p-type germanium.

11. The means defined in claim 1 wherein said temperature sensitive device in the region of the connections of the leads to the semiconductor elements is encapsulated in a relatively inert potting substance.

References Cited

UNITED STATES PATENTS

| | | | |
|---|---|---|---|
| 2,337,000 | 12/1943 | Ray | 136—227 |
| 2,886,475 | 5/1959 | McKay | 136—225 X |
| 2,906,801 | 9/1959 | Fritts | 136—224 |
| 2,916,537 | 12/1959 | Reid et al. | 136—225 X |
| 2,981,775 | 4/1961 | Bachman | 136—227 |
| 3,053,922 | 9/1962 | Schunke | 136—224 |
| 3,057,940 | 10/1962 | Fritts | 136—205 |
| 3,279,954 | 10/1966 | Cody et al. | 136—205 |
| 3,351,498 | 11/1967 | Shinn et al. | 136—205 |
| 3,411,955 | 11/1968 | Weiss | 136—205 |
| 3,497,398 | 2/1970 | Ehrenberg et al. | 136—227 |
| 2,952,725 | 9/1960 | Evans et al. | 136—228 |
| 2,981,775 | 4/1961 | Bachman | 136—227 |

OTHER REFERENCES

Metals Handbook, 1948, pp. 176, 177.

CARL D. QUARFORTH, Primary Examiner

H. E. BEHREND, Assistant Examiner

U.S. Cl. X.R.

136—225, 227